US010285088B2

(12) United States Patent
Sebire et al.

(10) Patent No.: US 10,285,088 B2
(45) Date of Patent: May 7, 2019

(54) METHODS AND APPARATUS FOR MINIMIZATION OF DRIVE TESTING

(71) Applicant: Nokia Technologies Oy, Espoo (FI)

(72) Inventors: Benoist Sebire, Tokyo (JP); Ilkka Keskitalo, Oulu (FI)

(73) Assignee: Nokia Technologies Oy, Espoo (FI)

( * ) Notice: Subject to any disclaimer, the term of this patent is extended or adjusted under 35 U.S.C. 154(b) by 113 days.

(21) Appl. No.: 15/512,517

(22) PCT Filed: Sep. 26, 2014

(86) PCT No.: PCT/IB2014/064874
§ 371 (c)(1),
(2) Date: Mar. 17, 2017

(87) PCT Pub. No.: WO2016/046606
PCT Pub. Date: Mar. 31, 2016

(65) Prior Publication Data
US 2017/0295511 A1    Oct. 12, 2017

(51) Int. Cl.
*H04W 24/10*    (2009.01)
*H04W 24/02*    (2009.01)
(Continued)

(52) U.S. Cl.
CPC ........... *H04W 24/10* (2013.01); *H04W 24/02* (2013.01); *H04W 24/08* (2013.01); *H04W 72/04* (2013.01);
(Continued)

(58) Field of Classification Search
CPC . H04W 24/02; H04W 24/08; H04W 74/0833; H04W 72/04; H04W 72/12; H04W 24/10
See application file for complete search history.

(56) References Cited

U.S. PATENT DOCUMENTS

2007/0230400 A1* 10/2007 Kuchibhotla ..... H04W 52/0216
                                                    370/331
2010/0265896 A1* 10/2010 Park .................. H04W 72/0413
                                                    370/329
(Continued)

FOREIGN PATENT DOCUMENTS

EP    2437540 A1    4/2012
EP    2677800 A2    12/2013
(Continued)

OTHER PUBLICATIONS

Office action received for corresponding European Patent Application No. 14795666.8, dated Jun. 28, 2018, 6 pages.
(Continued)

*Primary Examiner* — Peter P Chau
(74) *Attorney, Agent, or Firm* — Harrington & Smith

(57) ABSTRACT

Systems and techniques for minimize drive testing measurements. Network elements including UEs and eNBs are configured to define measurement procedures to determine control plane latency affecting scheduling requests, RACH procedures, and combinations thereof. Upon initiation of a request for uplink resources, such as a scheduling request or a RACH procedure, a UE notes the time of the request and measures the time until its fulfillment. If a scheduling request fails, a RACH procedure may be performed and in such cases, the time from initiation of the scheduling request, through its failure, until successful completion of the RACH procedure may be measured. Once a measurement has been made, the measured duration and other associated information are assembled and analyzed, and when the measurement and other information meets criteria for inclusion in a measurement report, the report is assembled and sent, or logged for sending, to an eNB.

20 Claims, 3 Drawing Sheets

(51) Int. Cl.
H04W 24/08 (2009.01)
H04W 72/04 (2009.01)
H04W 72/12 (2009.01)
H04W 74/08 (2009.01)

(52) U.S. Cl.
CPC ....... *H04W 72/12* (2013.01); *H04W 74/0833* (2013.01)

(56) References Cited

U.S. PATENT DOCUMENTS

| | | | | |
|---|---|---|---|---|
| 2011/0149925 | A1* | 6/2011 | Olsson | H04W 36/0022 370/337 |
| 2011/0194441 | A1 | 8/2011 | Jung et al. | |
| 2011/0207485 | A1* | 8/2011 | Dimou | H04W 36/0055 455/507 |
| 2012/0190364 | A1* | 7/2012 | Wu | H04W 24/10 455/436 |
| 2016/0057767 | A1* | 2/2016 | Kim | H04W 24/10 370/329 |

FOREIGN PATENT DOCUMENTS

| | | |
|---|---|---|
| WO | 2013/143458 A1 | 10/2013 |
| WO | 2014/084499 A1 | 6/2014 |

OTHER PUBLICATIONS

"3rd Generation Partnership Project; Technical Specification Group Radio Access Network; Universal Terrestrial Radio Access (UTRA) and Evolved Universal Terrestrial Radio Access (E-UTRA); Radio measurement collection for Minimization of Drive Tests (MDT); Overall description; Stage 2 (Release 12)", 3GPP TS 37.320, V12.1.0, Jun. 2014, pp. 1-25.

"3rd Generation Partnership Project; Technical Specification Group Radio Access Network; Evolved Universal Terrestrial Radio Access (E-UTRA); Medium Access Control (MAC) protocol specification (Release 12)", 3GPP TS 36.321, V12.2.1, Jun. 2014, pp. 1-57.

"3rd Generation Partnership Project; Technical Specification Group Radio Access Network; Evolved Universal Terrestrial Radio Access (E-UTRA); Radio Resource Control (RRC); Protocol specification (Release 12)", 3GPP TS 36.331, V12.2.0, Jun. 2014, pp. 1-365.

"[77#24] Joint: MDT Latency Measurement", 3GPP TSG-RAN Working Group 2 meeting #77bis, R2-121331, MediaTek, Mar. 24-30, 2012, pp. 1-8.

"3rd Generation Partnership Project; Technical Specification Group Services and System Aspects; Telecommunication management; Performance Management (PM); Performance measurements Evolved Universal Terrestrial Radio Access Network (E-UTRAN) (Release 12)", 3GPP TS 32.425, V12.0.0, Jun. 2013, pp. 1-74.

"Consideration on MDT Latency Measurement", 3GPP TSG-RAN Working Group 2 meeting #78, R2-122448, Agenda: 5.2.1, China Unicorn, May 21-25, 2012, 2 pages.

International Search Report and Written Opinion received for corresponding Patent Cooperation Treaty Application No. PCT/IB2014/064874, dated Jun. 18, 2015, 11 pages.

"Handling of a SR Collision With ACK/NACK Repetition", 3GPP TSG-RAN Working Group 2 meeting #78, R2-122723, Research in Motion UK limited, May 21-25, 2012, 3 Pages.

"LTE UE Uplink Out-of-Sync Handling", 3GPP TSG-RAN Working Group 2 meeting #80, R2-125329, Qualcomm Incorporated, Nov. 12-16, 2012, 5 Pages.

\* cited by examiner

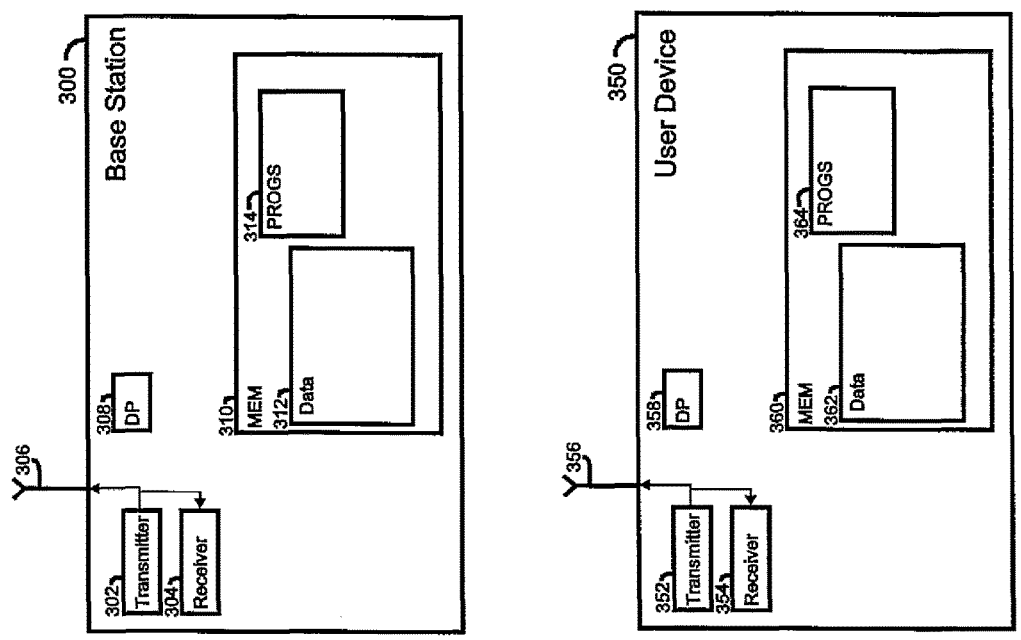

METHODS AND APPARATUS FOR MINIMIZATION OF DRIVE TESTING

RELATED APPLICATION

This application was originally filed as PCT Application No. PCT/IB2014/064874 filed Sep. 26, 2014.

FIELD OF THE INVENTION

The present invention relates generally to wireless communication. More particularly, the invention relates to improved systems and techniques for measurement of network conditions.

BACKGROUND

Design and maintenance of wireless communication networks naturally involves testing of network conditions and refinement of network elements based on the network conditions. One approach is through drive testing—traveling through the network environment (for example, in a van equipped with test devices) and measure coverage and signal quality of the network in order to gather data that can be used to refine the network. Driving through a network environment and collecting measurements is naturally expensive and, in addition, adds at least somewhat to road traffic, noise, and pollution. Network operators have turned, as much as possible, to automated approaches, which have been defined by third generation partnership project (3GPP) standards relating to minimization of drive testing (MDT). User devices report network conditions, and these reports can be analyzed for the information they yield about network performance. Two reporting approaches have been defined—immediate reporting and logged reporting. With immediate mode MDT reporting, measurements are reported immediately after being performed. With logged MDT reporting, a user device is configured when in connected mode and takes measurements while in idle mode. Reports are sent to the network when the user device enters connected mode.

SUMMARY OF THE INVENTION

This section contains examples of possible implementations and is not meant to be limiting.

In one embodiment of the invention, an apparatus comprises memory, at least one processor, and a program of instructions. The memory storing the program of instructions is configured, with the at least one processor, to cause the apparatus to at least control a user device to note the time of a request from the user device of uplink transmission resources, control the user device to measure the elapsed time between the request for uplink transmission resources and fulfillment of the request, and assemble the measurement information for the elapsed time for inclusion in a measurement report to be transmitted to a network.

In another embodiment of the invention, a method comprises controlling a user device to note the time of a request from the user device of uplink transmission resources, controlling the user device to measure the elapsed time between the request for uplink transmission resources and fulfillment of the request, and assembling the measurement information for the elapsed time for inclusion in a measurement report to be transmitted to a network.

In another embodiment of the invention, a computer readable medium stores a program of instructions. Execution of the program of instructions by a processor configures an apparatus to at least control a user device to note the time of a request from the user device of uplink transmission resources, control the user device to measure the elapsed time between the request for uplink transmission resources and fulfillment of the request, and assemble the measurement information for the elapsed time for inclusion in a measurement report to be transmitted to a network.

In another embodiment of the invention, an apparatus comprises means for controlling a user device to note the time of a request from the user device of uplink transmission resources, means for controlling the user device to measure the elapsed time between the request for uplink transmission resources and fulfillment of the request, and means for assembling the measurement information for the elapsed time for inclusion in a measurement report to be transmitted to a network.

BRIEF DESCRIPTION OF THE DRAWINGS

FIG. 3 illustrates elements used in carrying out one or more embodiments of the present invention.

DETAILED DESCRIPTION

Various embodiments of the present invention address changing usage of wireless networks and changes in the importance of factors relating to network performance. Aspects of network performance include quality of service (measured by bit rate for non-guaranteed bit rate uses), radio link failure (RLF) and radio connection establishment failure (RCEF).

Network usage is being dominated more and more by smartphones and other devices using data communication. Such devices often require an always online connection, in which a device communicates with the network (and, through the network, servers providing data) whether or not the user is actively using the device. Even in "idle" mode, then, a device may generate frequent, if small, data packets which have to be sent to the network, while also receiving such data packets from the network. With large numbers of data communication devices, such traffic may constitute a substantial portion of, or even most of, the communication over the network. Such traffic requires efficient operation for call setups and resource allocations. Traffic most characteristic of smartphone and similar data communication devices calls for short control plane (CP) delays, and delays in setting up for and achieving individual packet transfer connections has a negative influence on the end user experience of service quality. In one or more embodiments, the invention provides mechanisms to measure control plane latency and latency related to allocation of resources after a scheduling request.

Figure 1:
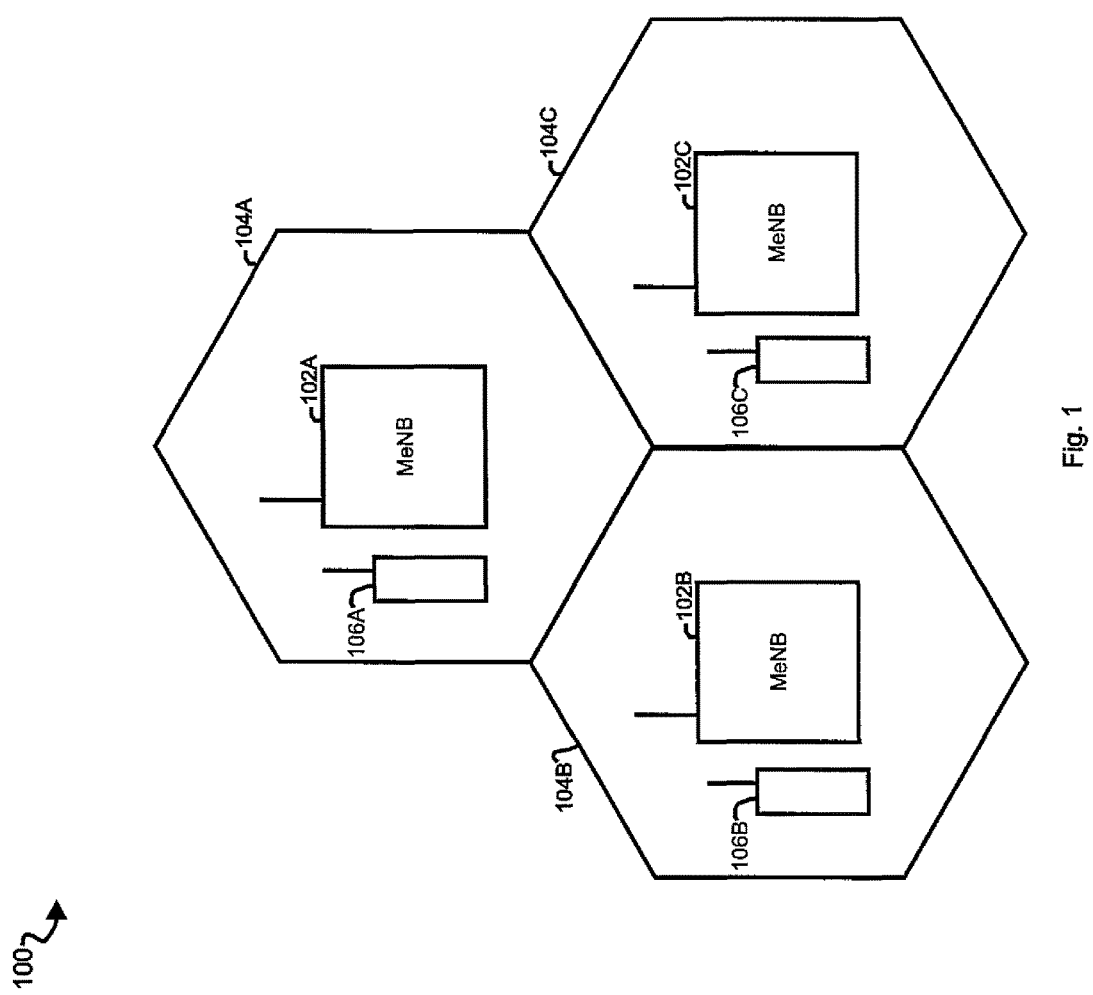
FIG. 1 illustrates a wireless network according to an embodiment of the present invention.

FIG. 1 illustrates a wireless network 100 comprising a plurality of base stations, which may be implemented in the form of 3GPP evolved Node Bs (eNBs) 102A-102C, defining cells 104A-104C, respectively. The network 100 supports user devices, implemented in the form of 3GPP user equipments (UEs), 106A-106C. The UEs may be used to take and report measurements of specified conditions, and these measurements can be used to compute information relating to network performance. The network performance information, and the measurements and measurement location can be used to determine adjustments to network parameters to improve performance.

Specifically, one or more embodiments of the invention provide mechanisms and define procedures for measurements of control plane latency and latency related to the time between a scheduling request is made and resources are allocated to fulfill the scheduling request.

Figure 2:
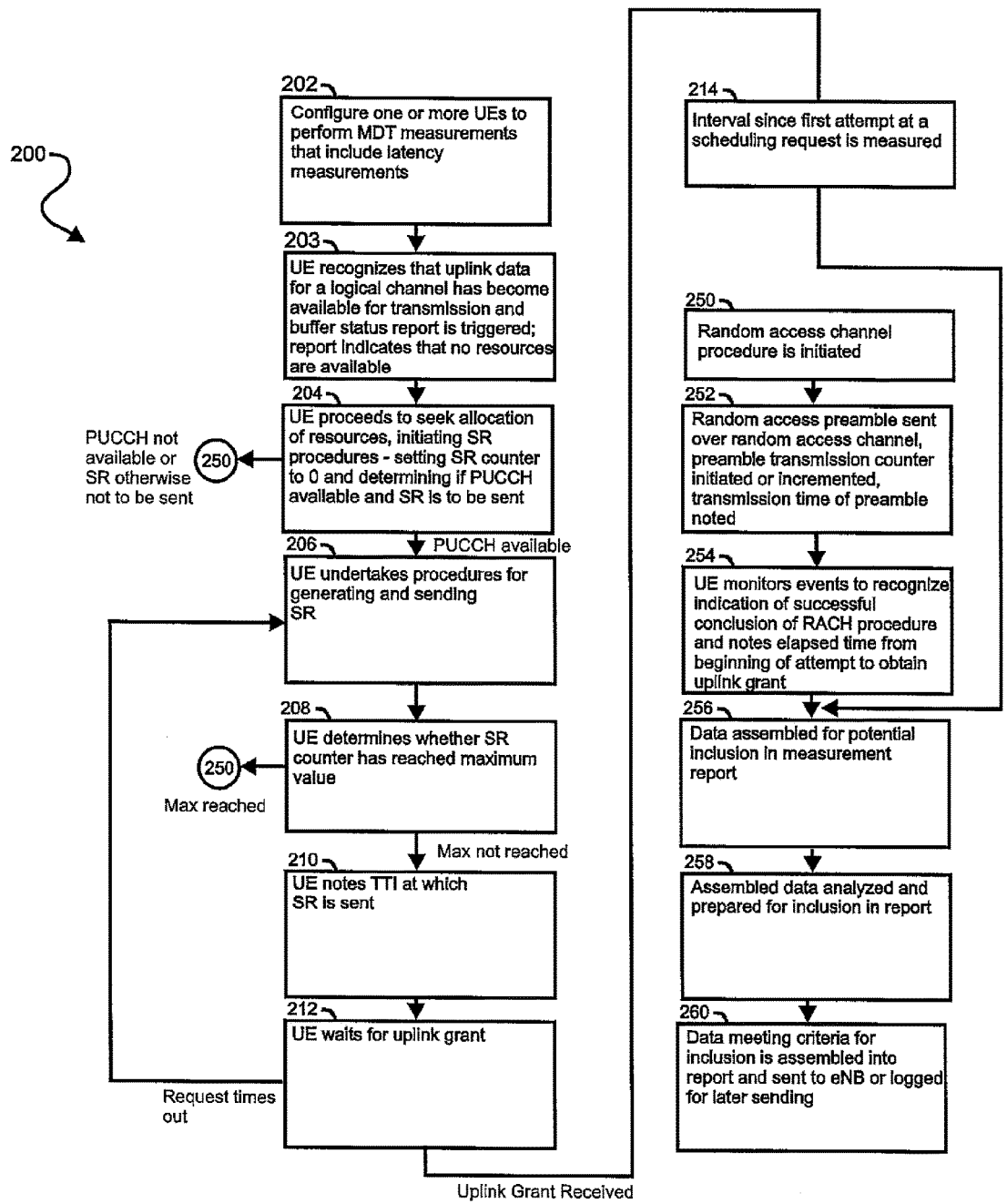
FIG. 2 illustrates a process according to an embodiment of the present invention.

In one or more embodiments of the invention, therefore, a network implements mechanisms allowing a UE to measure the time it takes to be allocated resources and to report those measurements to its serving eNB. FIG. 2 illustrates a process 200 of latency measurement according to an embodiment of the present invention. The process 200 may be performed in an ongoing fashion, with a number of alternative approaches to latency measurement being taken.

At block 202, one or more UEs are configured to perform MDT measurements that include latency measurements. The configuration specifies the measurements to be taken under various conditions, and the information collected for delivery to the eNB. Conditions include, for example, whether it is possible to send a scheduling request (SR) on the physical uplink control channel (PUCCH). The configuration may specify the mechanisms for latency measurement, and may specify different latency measurements depending on (for example) whether a scheduling request is sent or a random access channel (RACH) procedure is followed. Information to be collected may be the number of scheduling requests that were sent, whether the maximum number of scheduling requests was sent, contention procedure results, counters, and other details of the prevailing conditions and the taking of the measurements.

At block 203, a UE recognizes that uplink data for a logical channel has become available for transmission in an RLC entity or in a PDCP entity, and this recognition triggers a buffer status report. Suppose that the buffer status report indicates that no resources are available. The process then proceeds to block 204 and the UE proceeds to seek allocation of resources, first determining if a scheduling request can be sent on the physical uplink control channel (PUCCH).

At block 204, then, the UE initiates scheduling request procedures—noting that it has data to transmit and that no other scheduling request is in progress. The UE sets the scheduling request counter to zero and determines if the physical uplink control channel is configured for a scheduling request and is otherwise available. If the physical uplink control channel is not configured for a scheduling request or is otherwise unavailable, the process skips to step 250 and a random access channel procedure is initiated. Reasons for unavailability of the physical access control channel might be that the timing advance timer (TAT) has expired, so that uplink synchronization has been lost. If the physical uplink control channel is configured for a scheduling request, the process proceeds to block 206 and the UE undertakes procedures for generating and sending the scheduling request—determining whether the state is Measurement GAP, whether the scheduling request prohibition timer sr-ProhibitTimer is running, and whether the value of SR_Counter is less than dsr-TransMax, with the UE incrementing the SR_Counter and sending the scheduling request if all of the required conditions are met, and also starting the scheduling request prohibition timer sr-ProhibitTimer.

At block 208, the UE determines whether SR_Counter has reached a maximum value. If so, the process skips to block 250 and a random access procedure is begun. If the SR_Counter is not at a maximum value, the process proceeds to block 210 and the UE notes the time transmission interval (TTI) at which the scheduling request is sent. At block 212, the UE waits for the uplink grant. If the request times out, the process branches back to block 206.

Once the base station has returned an uplink grant, the process proceeds to step 214 and the interval that has elapsed since sending of the first attempt at a scheduling request is evaluated and measurement information is created identifying the scheduling request and including the value of the latency interval. The measurement entry may include, for example, the SR_Counter value, and an indication of whether the dsr-TransMax value has been reached. The process then proceeds to block 256.

At block 250, a random access channel procedure is initiated. The random access channel procedure may come as a result of failure to initiate or failure to complete a scheduling request procedure, because the UE is not configured to perform a scheduling request procedure at one time or another, because the UE alternates between scheduling request and random access channel procedures, or for any other suitable reason. It will be recognized that performing a scheduling request procedure and performing a random access channel procedure need not be done sequentially, but that the presentation here is simply for convenience in illustrating procedures that may be performed and latency measurements taken.

At block 252, a random access preamble is sent over a random access channel and the value of PREAMBLE_TRANSMISSION COUNTER is initiated or incremented, depending on whether an attempt is being initiated or continued after a timeout or failure, and the transmission time interval at which the preamble is sent is noted. Other timers relating to the procedure are initiated, such as the mac-ContentionResolutionTimer, if a contention-based RACH procedure is being used. At block 254, the UE monitors events in order to recognize an indication of successful conclusion of the RACH procedure and notes the elapsed time from the transmission time interval marking the beginning of the attempt to obtain an uplink grant. If the RACH procedure was performed as a result of a failed or timed out scheduling request procedure, the elapsed time will include the time from the sending of the scheduling request.

At block 256, data is assembled for potential inclusion in a measurement report. Data includes the latency interval and may also include additional elements—for example, the value of SR_COUNTER, an indication of whether or not dsr-TransMax was reached, the value of mac-ContentionResolutionTimer (if a random access procedure was performed), and the value of PREAMBLE_TRANSMISSION_COUNTER. The measurement may also include the value of the T300 radio resource control (RRC) connection timer for a successful connection establishment request, as well as an indicator to distinguish resource requests made in connected mode from those made in idle mode. The measurement may also include an indicator showing whether scheduling request or a RACH procedure was used, or whether both a scheduling request and a RACH procedure were used (indicating that a RACH procedure was used after failure of a scheduling request).

At block 258, the assembled data is analyzed and prepared for inclusion in a measurement report to be sent to an eNB or other suitable network element. Measurement reports may, for example, be limited to measurements exceeding a predefined threshold or meeting other criteria, with the criteria being configured by radio resource control. In addition, as noted above, a reporting configuration may be used to indicate parameters to be included in the report. The configuration may be signaled to the UE. At block 260D, data meeting criteria for inclusion in a measurement report is assembled into the report and, depending on whether MDT is being performed in immediate mode or logged mode, immediately transmitted to the UE or stored for later transmission. While latency measurements are discussed here for simplicity, it is also possible to collect additional information, such as quality of service information and radio link failure information, and include this information in the same measurement report as latency information.

FIG. 3 illustrates details of a base station, implemented as an eNB 300, and a mobile communication device, implemented as user device or UE 350. The eNB 300 may suitably comprise a transmitter 302, receiver 304, and antenna 306. The eNB 300 may also include a processor 308 and memory 310. The eNB 300 may employ data 312 and programs (PROGS) 314, residing in memory 310.

The UE 350 may suitably comprise a transmitter 352, receiver 354, and antenna 356. The UE 350 may also include a processor 358 and memory 360. The UE 350 may employ data 362 and programs (PROGS) 364, residing in memory 360.

At least one of the PROGs 314 in the eNB 300 is assumed to include a set of program instructions that, when executed by the associated DP 308, enable the device to operate in accordance with the exemplary embodiments of this invention, as detailed above. In these regards the exemplary embodiments of this invention may be implemented at least in part by computer software stored on the MEM 310, which is executable by the DP 308 of the eNB 300, or by hardware, or by a combination of tangibly stored software and hardware (and tangibly stored firmware). Similarly, at least one of the PROGs 364 in the UE 350 is assumed to include a set of program instructions that, when executed by the associated DP 358, enable the device to operate in accordance with the exemplary embodiments of this invention, as detailed above. In these regards the exemplary embodiments of this invention may be implemented at least in part by computer software stored on the MEM 360, which is executable by the DP 358 of the UE 350, or by hardware, or by a combination of tangibly stored software and hardware (and tangibly stored firmware). Electronic devices implementing these aspects of the invention need not be the entire devices as depicted at FIG. 1 or FIG. 3 or may be one or more components of same such as the above described tangibly stored software, hardware, firmware and DP, or a system on a chip SOC or an application specific integrated circuit ASIC.

In general, the various embodiments of the UE 350 can include, but are not limited to personal portable digital devices having wireless communication capabilities, including but not limited to cellular telephones, navigation devices, laptop/palmtop/tablet computers, digital cameras and music devices, and Internet appliances.

Various embodiments of the computer readable MEM 310 and 360 include any data storage technology type which is suitable to the local technical environment, including but not limited to semiconductor based memory devices, magnetic memory devices and systems, optical memory devices and systems, fixed memory, removable memory, disc memory, flash memory, DRAM, SRAM, EEPROM and the like. Various embodiments of the DP 308 and 358 include but are not limited to general purpose computers, special purpose computers, microprocessors, digital signal processors (DSPs) and multi-core processors.

Electronic devices implementing these aspects of the invention need not be the entire devices as depicted at FIG. 1 or FIG. 3 or may be one or more components of same such as the above described tangibly stored software, hardware, firmware and DP, or a system on a chip SOC or an application specific integrated circuit ASIC.

Various modifications and adaptations to the foregoing exemplary embodiments of this invention may become apparent to those skilled in the relevant arts in view of the foregoing description. While various exemplary embodiments have been described above it should be appreciated that the practice of the invention is not limited to the exemplary embodiments shown and discussed here.

Further, some of the various features of the above non-limiting embodiments may be used to advantage without the corresponding use of other described features. The foregoing description should therefore be considered as merely illustrative of the principles, teachings and exemplary embodiments of this invention, and not in limitation thereof.

We claim:

1. An apparatus comprising:
   at least one non-transitory memory;
   at least one processor;
   a program of instructions configured to, with the memory and the at least one processor, configure the apparatus to at least:
   control, by the apparatus, a user device to note the time of a request, from the user device, for uplink transmission resources;
   control, by the apparatus, the user device to measure elapsed time between the request for the uplink transmission resources and fulfillment of the request for the uplink transmission resources;
   assemble measurement information of the elapsed time for inclusion in a measurement report to be transmitted to a network, wherein the measurement report is configured to be analyzed by the network to minimize drive testing; and
   cause, by the apparatus, transmission of the measurement report to the network.

2. The apparatus of claim 1, wherein the request for the uplink transmission resources comprises a scheduling request and noting the time of the request comprises noting a transmission time interval of the request.

3. The apparatus of claim 1, wherein the apparatus is further caused to determine if a scheduling request is to be sent, and if the scheduling request is not to be sent, to control the user device to perform the request for the uplink transmission resources as a random access channel procedure.

4. The apparatus of claim 1, wherein the measurement report includes one or more parameters relating to generation and fulfillment of the request for the uplink transmission resources.

5. The apparatus of claim 4, wherein the one or more parameters include at least one of a number of scheduling requests required, an indication of whether or not a maximum number of scheduling requests was reached, whether or not a random access channel procedure was required, and timing of contention resolution when a random access channel procedure was performed.

6. The apparatus of claim 4, wherein the one or more parameters comprise an indication of whether or not the request for the uplink transmission resources was a scheduling request, an initiation of a random access channel procedure, or both.

7. The apparatus of claim 1, wherein the measurement information of the elapsed time is included in the measurement report only when the elapsed time exceeds a predefined threshold.

8. A method comprising:
controlling a user device to note the time of a request from the user device of uplink transmission resources;
controlling the user device to measure elapsed time between the request for the uplink transmission resources and fulfillment of the request for the uplink transmission resources;
assembling measurement information of the elapsed time for inclusion in a measurement report to be transmitted to a network, wherein the measurement report is configured to be analyzed by the network to minimize drive testing; and
causing transmission of the measurement report to the network.

9. The method of claim 8, wherein the request for the uplink transmission resources comprises a scheduling request and noting the time of the request comprises noting a transmission time interval of the request.

10. The method of claim 8, further comprising determining if a scheduling request is to be sent, and if the scheduling request is not to be sent, controlling the user device to perform the request for the uplink transmission resources as a random access channel procedure.

11. The method of claim 8, wherein the measurement report includes one or more parameters relating to generation and fulfillment of the request for the uplink transmission resources.

12. The method of claim 11, wherein the one or more parameters include at least one of a number of scheduling requests required, an indication of whether a maximum number of scheduling requests was reached, whether or not a random access channel procedure was required, and timing of contention resolution when a random access channel procedure was performed.

13. The method of claim 11, wherein the one or more parameters comprise an indication of whether or not the request for the uplink transmission resources was a scheduling request, an initiation of a random access channel procedure, or both.

14. The method of claim 8, wherein the measurement information of the elapsed time is included in the measurement report only when the elapsed time exceeds a predefined threshold.

15. A non-transitory computer readable medium storing a program of instructions, execution of which by a processor configures an apparatus to at least:
control, by the apparatus, a user device to note the time of a request from the user device for uplink transmission resources;
control, by the apparatus, the user device to measure elapsed time between the request for the uplink transmission resources and fulfillment of the request for the uplink transmission resources;
assemble measurement information of the elapsed time for inclusion in a measurement report to be transmitted to a network, wherein the measurement report is configured to be analyzed by the network to minimize drive testing; and
cause, by the apparatus, transmission of the measurement report to the network.

16. The computer readable medium of claim 15, wherein the request for the uplink transmission resources comprises a scheduling request and noting the time of the request comprises noting a transmission time interval of the request.

17. The computer readable medium of claim 15, wherein the apparatus is further configured to determine if a scheduling request is to be sent, and if the scheduling request is not to be sent, to control the user device to perform the request for the uplink transmission resources as a random access channel procedure.

18. The computer readable medium of claim 15, wherein the measurement report includes one or more parameters relating to generation and fulfillment of the request for the uplink transmission resources.

19. The computer readable medium of claim 18, wherein the one or more parameters include at least one of a number of scheduling requests required, an indication of whether or not a maximum number of scheduling requests was reached, whether or not a random access channel procedure was required, and timing of contention resolution when a random access channel procedure was performed.

20. The computer readable medium of claim 15, wherein the measurement information of the elapsed time is included in the measurement report only when the elapsed time exceeds a predefined threshold.

* * * * *